US011112348B2

(12) United States Patent
Elder

(10) Patent No.: US 11,112,348 B2
(45) Date of Patent: Sep. 7, 2021

(54) WEAR SENSORS FOR MONITORING SEAL WEAR IN BEARING ARRANGEMENTS

(71) Applicant: Hamilton Sundstrand Corporation, Charlotte, NC (US)

(72) Inventor: James S. Elder, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 99 days.

(21) Appl. No.: 16/365,031

(22) Filed: Mar. 26, 2019

(65) Prior Publication Data

US 2020/0309673 A1 Oct. 1, 2020

(51) Int. Cl.
*F16J 15/34* (2006.01)
*F16C 19/52* (2006.01)
(Continued)

(52) U.S. Cl.
CPC ............ *G01N 17/00* (2013.01); *F16C 33/664* (2013.01); *F16C 33/76* (2013.01); *F16C 2233/00* (2013.01)

(58) Field of Classification Search
CPC . B02C 2/00; B04C 11/00; B23K 20/00; B23P 11/00; B60C 11/00; B60G 2204/00; B60R 16/00; B60R 19/00; B62D 3/00; B63B 79/00; B63H 23/00; C10M 7/00; C10M 2201/00; C10N 2030/00; C10N 2040/00; C10N 2050/00; C23C 4/00; C23C 24/00; C23C 28/00; C23F 13/00; C23F 2213/00; C25D 5/00; E21B 3/00; E21B 21/00; E21B 33/00; E21B 47/00; F01D 5/00; F01D 11/00; F01D 17/00; F01D 21/00; F01D 25/00; F02C 3/00; F02C 7/00; F04D 29/00; F05D 2220/00; F05D 2230/00; F05D 2240/00; F05D 2250/00; F05D 2260/00; F05D 2270/00; F05D 2300/00; F16C 11/00; F16C 17/00; (Continued)

(56) References Cited

U.S. PATENT DOCUMENTS 4,497,493 A 2/1985 Sall et al.
5,540,448 A 7/1996 Heinzen
(Continued)

FOREIGN PATENT DOCUMENTS

DE 3444175 C1 3/1986
GB 2516119 A 1/2015

OTHER PUBLICATIONS

European Search Report for Application No. 19211458.5, dated Jul. 10, 2020, 5 pages.

*Primary Examiner* — Melissa J Koval
*Assistant Examiner* — Joseph O Nyamogo
(74) *Attorney, Agent, or Firm* — Cantor Colburn LLP

(57) ABSTRACT

A sensor assembly includes a wear sensor and a seal member. The wear sensor has an encapsulation body with a wear face, a sacrificial conductor embedded within the encapsulation body and spaced apart from the wear face, and a monitoring lead extending into the encapsulation body and connected to the sacrificial conductor. The wear sensor is fixed relative to the seal member and the encapsulation body has a wear coefficient that is greater than a wear coefficient of the seal member. Bearing arrangements and methods of monitoring seal wear in bearing arrangements are also described.

13 Claims, 6 Drawing Sheets

(51) Int. Cl.
*F16C 17/24* (2006.01)
*F16C 41/00* (2006.01)
*F16C 23/00* (2006.01)
*G01N 17/00* (2006.01)
*F16C 33/66* (2006.01)
*F16C 33/76* (2006.01)

(58) Field of Classification Search
CPC .......... F16C 19/00; F16C 23/00; F16C 27/00;
F16C 2360/00; F16C 33/00; F16C 35/00;
F16C 41/00; F16C 43/00; F16C 2202/00;
F16C 2204/00; F16C 2223/00; F16C
2233/00; F16C 2240/00; F16C 2300/00;
F16C 2326/00; F16D 55/00; F16D 66/00;
F16J 15/00; F16K 37/00; F23M 5/00;
F23M 11/00; F23R 3/00; G01B 5/00;
G01B 7/00; G01B 21/00; G01D 5/00;
G01K 1/00; G01K 3/00; G01L 1/00;
G01L 5/00; G01L 9/00; G01M 3/00;
G01M 13/00; G01M 15/00; G01N 3/00;
G01N 17/00; G01N 21/00; G01N 27/00;
G01N 33/00; G01N 2021/00; G01Q
60/00; G01R 1/00; G01R 3/00; G01R
15/00; G01R 19/00; G01R 22/00; G01R
27/00; G01R 29/00; G01R 31/00; G01R
33/00; G01R 35/00; G06F 17/00; G07C
9/00; G03G 15/00; H01F 17/00; H01F
27/00; H01F 2017/00; H01F 2021/00;
H01H 1/00; H01H 2001/00; H01H
2009/00; H01L 22/00; H01L 23/00; H01L
24/00; H01L 25/00; H01L 27/00; H01L
29/00; H01L 2223/00; H01L 2224/00;
H01L 2924/00; H01R 9/00; H01R 12/00;
H02M 1/00; H02M 3/00; H02M 7/00;
H02M 2001/00; H02M 2003/00; H02P
5/00; H03B 5/00; H03D 3/00; H03D
7/00; H03F 1/00; H03F 3/00; H03F
2200/00; H03F 2203/00; H03G 1/00;
H03G 3/00; H03H 7/00; H03H 11/00;
H03H 19/00; H03J 1/00; H03J 3/00;
H03J 2200/00; H03K 17/00; H03L 7/00;
H03L 2207/00; H04B 17/00; H04L 27/00;
H04R 3/00; H04R 29/00; H04W 24/00;
H05K 1/00; H05K 3/00; H05K 7/00;
Y02B 70/00; Y02P 70/00; Y10S 277/00;
Y02T 50/00; Y10T 29/00; Y10T 428/00;
Y10T 307/00
See application file for complete search history.

(56) References Cited

U.S. PATENT DOCUMENTS

| | | | |
|---|---|---|---|
| 6,615,639 | B1 | 9/2003 | Heinzen |
| 7,270,890 | B2 * | 9/2007 | Sabol ........................ C23C 4/18 |
| | | | 428/632 |
| 7,677,079 | B2 * | 3/2010 | Radziszewski .......... G01N 3/56 |
| | | | 73/7 |
| 8,527,214 | B2 | 9/2013 | Horak |
| 9,541,199 | B2 | 1/2017 | Rust |
| 9,989,097 | B2 | 6/2018 | Hebrard et al. |
| 2017/0009550 | A1 * | 1/2017 | Leuchtenberg ............ E21B 3/00 |
| 2017/0058956 | A1 * | 3/2017 | Dittes ................ G01N 27/4166 |
| 2018/0283557 | A1 | 10/2018 | Lang et al. |
| 2019/0040959 | A1 * | 2/2019 | Sommers ............. F16J 15/3492 |

* cited by examiner

WEAR SENSORS FOR MONITORING SEAL WEAR IN BEARING ARRANGEMENTS

BACKGROUND

The subject matter disclosed herein generally relates to rotating machinery, and more particularly to monitoring seal wear in bearing arrangements such as in rotating machinery.

Rotating machinery, such as aircraft main engines and auxiliary power units, commonly employ dynamic seals to prevent lubricating and cooling oil communicated to the bearing compartment from escaping the bearing compartment. Dynamic seals typically employ a seal carrier supporting a carbon seal ring and a bellows. The bellows urges the seal carrier and carbon seal ring against a rotating steel ring such that contacting surfaces of the carbon seal ring and the steel ring retain oil provided to the bearing compartment on one side of the contacting surfaces.

Even though the contacting surfaces are lubricated by the oil provided to the bearing compartment the carbon seal ring generally wears over time. The wear rate is typically a function of the axial load exerted on the carbon seal ring, oil temperature, and oil flow rate as well as the surface finish and angularity imparted into the contacting surfaces by the tolerances of manufacturing processes used to form the surfaces. Since wear of the carbon seal ring beyond a certain level can cause the seal carrier to contact the rotating seal ring, allowing oil to the escape the bearing compartment and/or metal debris to enter the oil system, seals are generally inspected and/or replaced during service. The interval between inspection and/or replacement events is typically determined based according to an estimation of the seal wear rate for a given dynamic seal application.

Such systems and methods have generally been considered suitable for their intended purpose. However, there remains a need for improved seal wear sensor assemblies, bearing arrangements having seal wear sensor assemblies, and methods of monitoring seal wear. The present disclosure provides a solution to this need.

BRIEF SUMMARY

In certain embodiments a sensor assembly is provided. The sensor assembly includes a wear sensor and a seal member. The wear sensor has an encapsulation body with a wear face, a sacrificial conductor embedded within the encapsulation body and spaced apart from the wear face, and a monitoring lead extending into the encapsulation body and connected to the sacrificial conductor. The wear sensor is fixed relative to the seal member and the encapsulation body has a wear coefficient that is greater than a wear coefficient of the seal member.

In addition to one or more of the features described above, or as an alternative, further embodiments may include that the encapsulation body is formed from a polymeric material.

In addition to one or more of the features described above, or as an alternative, further embodiments may include that the sacrificial conductor is electrically insulated by the encapsulation body.

In addition to one or more of the features described above, or as an alternative, further embodiments may include that the sacrificial conductor is electrically continuous within the encapsulation body.

In addition to one or more of the features described above, or as an alternative, further embodiments may include that the sacrificial conductor is electrically discontinuous within the encapsulation body.

In addition to one or more of the features described above, or as an alternative, further embodiments may include that the sacrificial conductor comprises a wire loop with a monitoring end and a wear face end, the wear face end of the wire loop arranged between the wear face of the encapsulation body and the monitoring end of wire loop.

In addition to one or more of the features described above, or as an alternative, further embodiments may include that the sacrificial conductor is a first sacrificial conductor and further comprising a second sacrificial conductor, the second sacrificial conductor connected to the first sacrificial conductor.

In addition to one or more of the features described above, or as an alternative, further embodiments may include that the second sacrificial conductor is connected electrically in series with the first sacrificial conductor.

In addition to one or more of the features described above, or as an alternative, further embodiments may include that the second sacrificial conductor is connected electrically in parallel with the first sacrificial conductor.

In addition to one or more of the features described above, or as an alternative, further embodiments may include a resistance meter in electrical communication with the sacrificial conductor.

In addition to one or more of the features described above, or as an alternative, further embodiments may include that the wherein the resistance meter comprises a processor in communication with a non-transitory machine readable medium with instructions recorded on it that, when read by the processor, cause the processor to apply a voltage to the sacrificial conductor, measure an electrical parameter of the sacrificial conductor, and provide an indication of seal wear when the measurement of the electrical parameter indicates that the sacrificial conductor is electrically discontinuous.

In addition to one or more of the features described above, or as an alternative, further embodiments may include that the resistance meter to measure seal wear based on at least two stepwise changes in the electrical parameter.

In addition to one or more of the features described above, or as an alternative, further embodiments may include that the electrical parameter is one of electrical resistance and current flow.

In accordance with certain embodiments a bearing arrangement is provided. The bearing arrangement includes a bearing compartment housing a bearing assembly, a sensor assembly as described above, the seal member being and the bearing arrangement including a second seal member with a contact face, wherein the wear face of the wear sensor is in frictional engagement with the contact face of the second seal member, wherein the first seal member is in frictional engagement with the contact face of the second seal member and impounds lubricant within the bearing compartment.

In addition to one or more of the features described above, or as an alternative, further embodiments may include that the bearing assembly has an inner race arranged along a rotation axis, an outer race extending about the inner race, and two or more roller elements distributed about the rotation axis and between the inner race and the outer race, wherein the first seal member is fixed in rotation relative to the outer race, and wherein the second seal member is fixed relative to the inner race.

In addition to one or more of the features described above, or as an alternative, further embodiments may include that a shaft supported for rotation by the bearing assembly, wherein the first seal member comprises a carbon material, wherein the second seal member comprises a steel material, wherein the shaft is low pressure shaft or a high pressure shaft of a gas turbine engine.

In further embodiments a method of monitoring seal wear is provided. The method includes, at a sensor assembly as described above, applying a voltage to sacrificial conductor, measuring an electrical parameter of the sacrificial conductor, and signalling seal wear in a seal member fixed relative to the wear sensor when the measurement indicates that the sacrificial conductor is electrically discontinuous, wherein the encapsulation body has wear coefficient that is greater than a wear coefficient of the seal member, and signalling no seal wear when the measurement indicates that the sacrificial conductor is electrically continuous.

In addition to one or more of the features described above, or as an alternative, further embodiments may include measuring seal wear based on at least two stepwise changes in the electrical parameter.

In addition to one or more of the features described above, or as an alternative, further embodiments may include that the electrical parameter is resistance of the sacrificial conductor.

In addition to one or more of the features described above, or as an alternative, further embodiments may include that the electrical parameter is current flow through the sacrificial conductor.

Technical effects of embodiments of the present disclosure include the capability to monitor seal wear. In certain embodiments the present disclosure provides the capability to monitor the progression of seal wear, such as in bearing arrangements in gas turbine engines. In accordance with certain embodiments the present disclosure provides the capability to monitor seal wear non-invasively, i.e., without alteration of the baseline configuration of seal members employed in a seal arrangement.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF DRAWINGS

The following descriptions should not be considered limiting in any way. With reference to the accompanying drawings, like elements are numbered alike.

DETAILED DESCRIPTION

Figure 1:
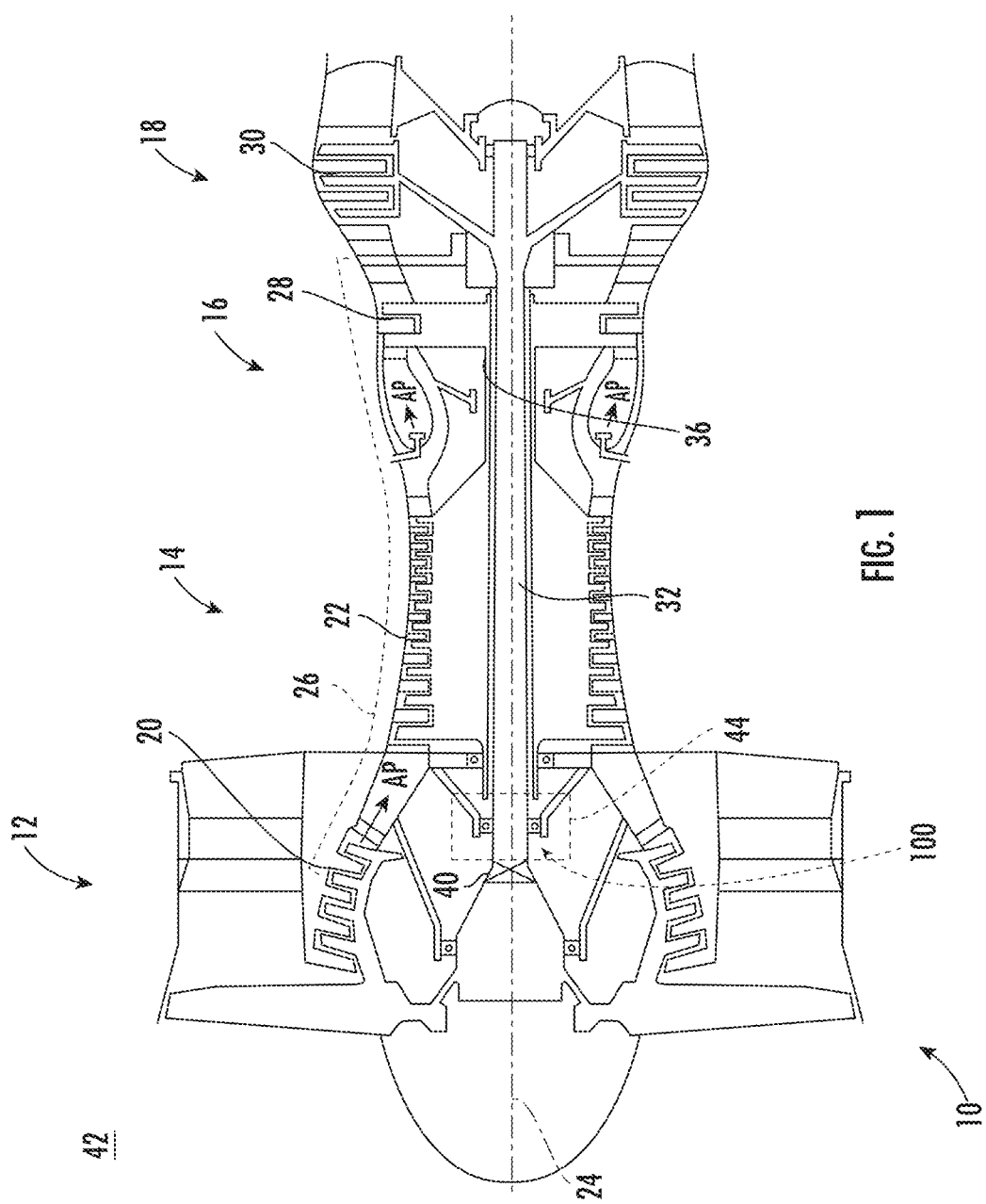
FIG. 1 schematic view of a gas turbine engine constructed in accordance with the present disclosure, showing a bearing arrangement with a sensor assembly for monitoring wear in seal members of the bearing arrangement.

Reference will now be made to the drawings wherein like reference numerals identify similar structural features or aspects of the subject disclosure. For purposes of explanation and illustration, and not limitation, a partial view of an exemplary embodiment of a bearing arrangement with a sensor assembly in accordance with the disclosure is shown in FIG. 1 and is designated generally by reference character 100. Other embodiments of sensor assemblies, bearing arrangements, and methods of monitoring seal wear in accordance with the present disclosure, or aspects thereof, are provided in FIGS. 2-7, as will be described. The systems and methods described herein can be used monitoring seal wear in rotating machinery, such as in bearing arrangements supporting rotating structures in gas turbine engines, though the present disclosure is not limited to gas turbine engines or to bearing arrangements in general.

Referring to FIG. 1, a cross section of gas turbine engine 10 is shown. The gas turbine engine 10 includes a fan 12, a compressor section 14, a combustion section 16, and a turbine section 18. The compressor section 14 includes a low pressure compressor 20 and a high pressure compressor 22 arranged along a rotation axis 24 and housed within a case 26. The turbine section 18 includes a high pressure turbine 28 and a low pressure turbine 30 and is also arranged along the rotation axis 24 and housed with the case 26. A low pressure shaft 32 connects the low pressure turbine 30 to the low pressure compressor 20 to form a low pressure spool 34. A high pressure shaft 36 connects the high pressure turbine 28 to the high pressure compressor 22 to a form a high pressure spool 38. The fan 12 is operatively associated with the low pressure spool 34 through a gearbox 40, which connects the fan 12 to the low pressure spool 34, and which allows the fan 12 to rotate about the rotation axis 24 at speed different than that of the low pressure spool 34. The bearing arrangement 100 is arranged within a bearing compartment 44 and supports the low pressure shaft 32 for rotation about the rotation axis 24 and includes a sensor assembly 102 (shown in FIG. 2).

During operation the compressor section 14 ingests air from the ambient environment 42 and compresses the air. The compressed air is communicated to the combustion section 16, which generates a flow of high pressure combustion products that the combustion section 16 communicates to the turbine section 18. The turbine section 18 expands the high pressure combustion products and extracts work therefrom as the high pressure combustion products successively traverse the high pressure turbine 28 and the low pressure turbine 30 prior to issue of the high pressure combustion products to the ambient environment 42. A portion of the extracted work is applied by the high pressure turbine 28 to rotate the high pressure compressor 22 through high pressure shaft 36. Another portion of the extracted work is applied by the low pressure turbine 30 to the low pressure compressor 20 and the fan 12 through the low pressure shaft 32.

Figure 2:
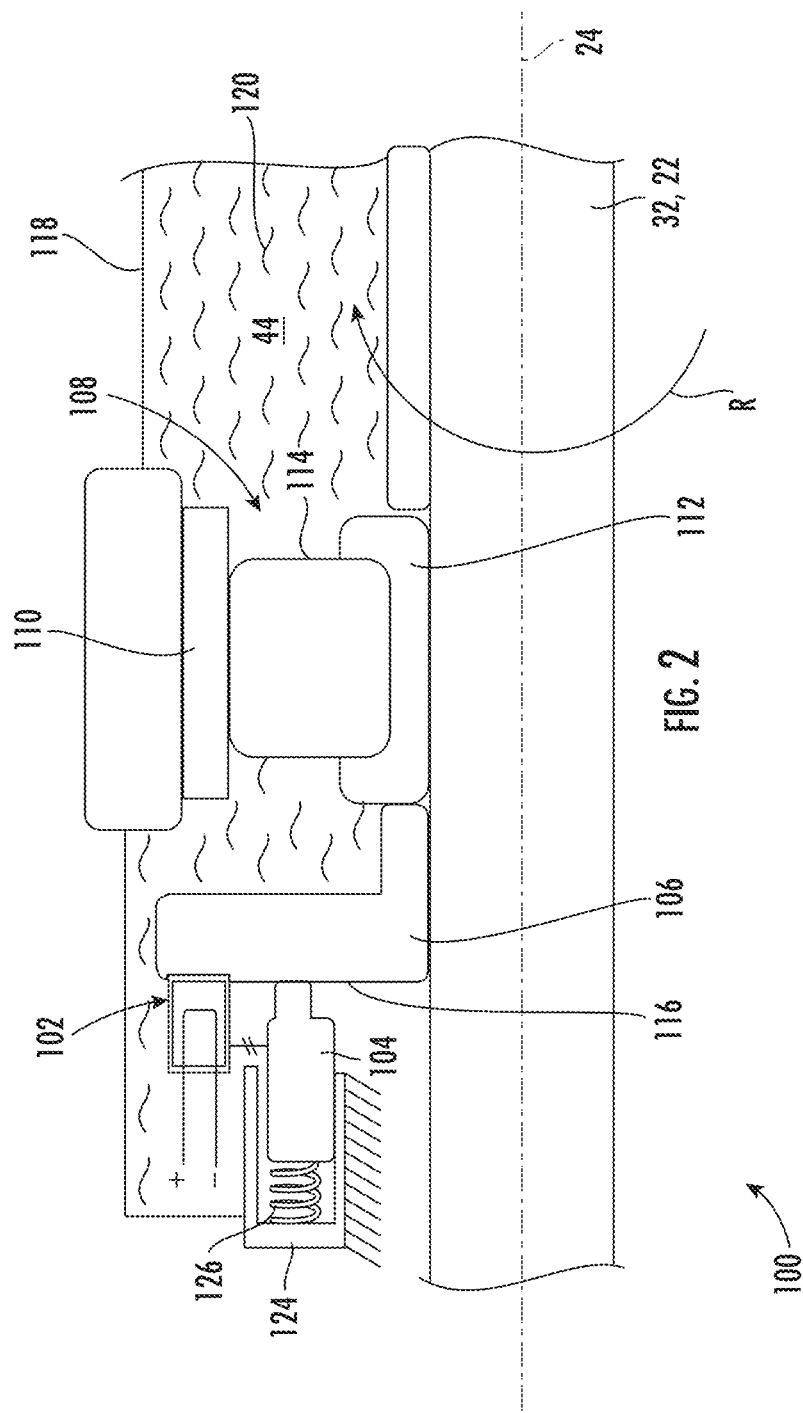
FIG. 2 is a schematic view of the bearing arrangement of FIG. 1, showing seal members and the sensor assembly of the bearing arrangement monitoring wear of a seal member.

With reference to FIG. 2, a portion of the bearing compartment 44 and the bearing arrangement 100 is shown. The bearing arrangement 100 includes a sensor assembly 102, a first seal member 104, a second seal member 106, and a bearing assembly 108. The bearing assembly 108 includes an outer race 110, an inner race 112, and a plurality of roller elements 114. The inner race 112 extends circumferentially about a shaft, e.g., the high pressure shaft 36 (shown in FIG. 1) or the low pressure shaft 32 (shown in FIG. 1), and is fixed relative to the shaft for rotation axis 24. The outer race 110 extends circumferentially about the inner race 112 and is fixed relative to a stationary structure, e.g., the case 26 (shown in FIG. 1). The plurality of roller elements 114 are distributed circumferentially about the inner race 112 and are each rotatable about a roller axis relative to the inner race 112 and the outer roller race.

The first seal member 104 extends circumferentially about the rotation axis 24, is fixed relative to the outer race 110 of the bearing assembly 108, and is a wear part. The second seal member 106 axially opposes the first seal member 104, extends circumferentially about the rotation axis 24, and is fixed in rotation relative to the inner race 112. A contact face 116 is defined on an axial end of the second seal member 106 and opposes the first seal member 104, the first seal member 104 being in frictional engagement with the contact face 116 of the second seal member 106 and thereby impounding a lubricant 120 within the bearing compartment 44. The wear sensor 128 is fixed relative to the first seal member 104, axially opposes the second seal member 106, and in frictional arrangement with the contact face 116 of the second seal member 106. As shown in FIG. 2 the second seal member 106 is arranged as runner fixed in rotation to a shaft, e.g., the low pressure shaft 32 (shown in FIG. 1) or the high pressure shaft 36 (shown in FIG. 1) of the gas turbine engine 10 (shown in FIG. 1).

As will also be appreciated by those of skill in the art in view of the present disclosure, the frictional engagement of the first seal member 104 with the second seal member 106 progressively wears the first seal member 104 during operation by removing material 122 from the first seal member 104. In some gas turbine engines accumulated wear can require the replacement of the first seal member 104, for example prior to a seal carrier 124 and/or a seal member biasing member 126 supporting the first seal member 104 coming into frictional engagement with the second seal member 106. While prognostic estimates can be used to determine when replacement of the first seal member 104 is required, estimates can sometimes result in the first seal member 104 being replaced earlier than required—adding expense and reducing the availability otherwise provided by the gas turbine engine 10 (shown in FIG. 1). To avoid unnecessary replacement events the sensor assembly 102 is provided to provide indication when accumulated wear of the first seal member 104 reaches a predetermined level, e.g., is exhibiting wear sufficient to warrant replacement at the next schedule overhaul of the gas turbine engine 10.

Figure 3:
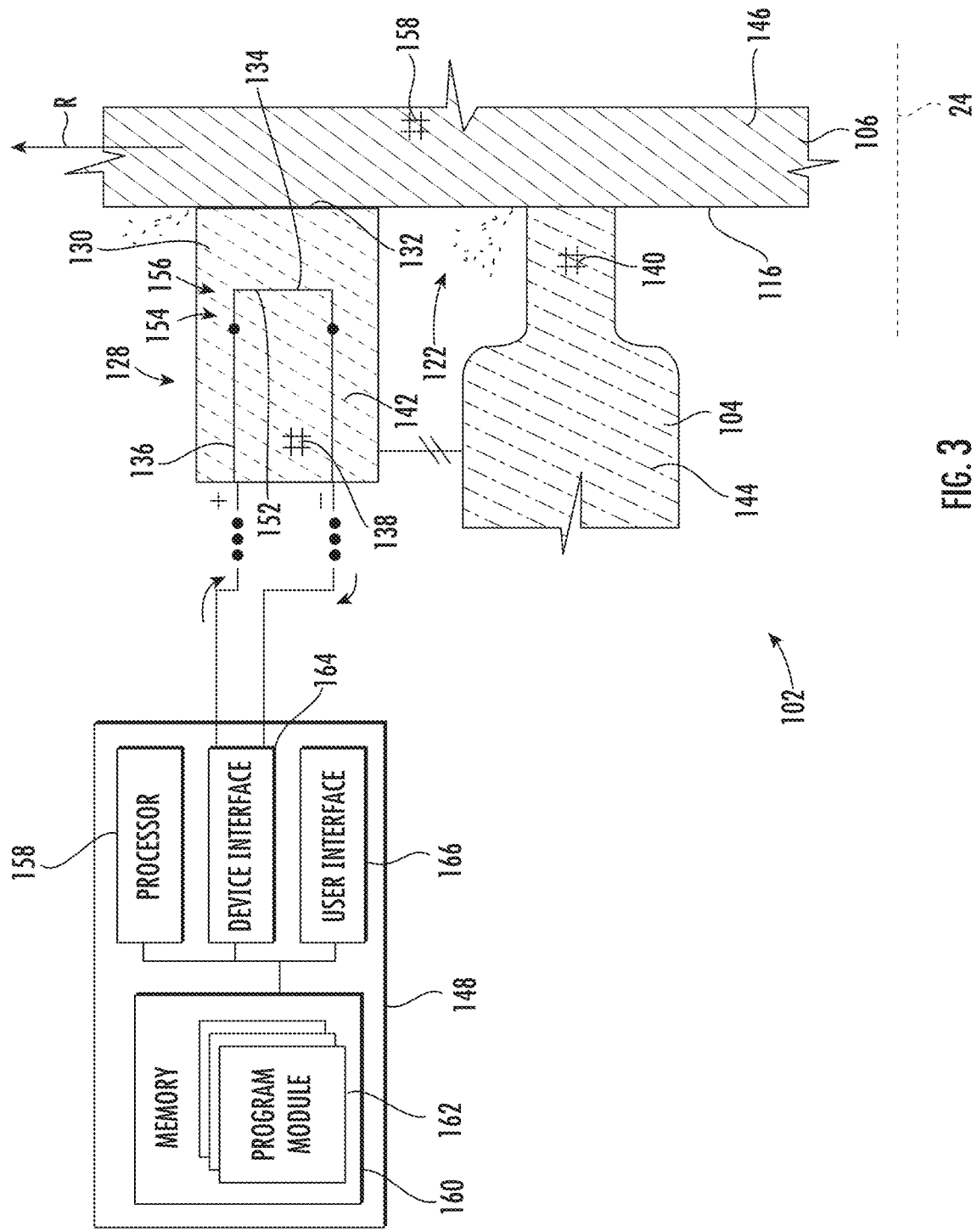
FIG. 3 is a schematic view of the sensor assembly of FIG. 1 according to an embodiment, showing a sacrificial conductor of the sensor assembly extending continuously within an encapsulation body prior to wear in the first seal member reaching a predetermined level.

With reference to FIG. 3, the sensor assembly 102 is shown. The sensor assembly 102 includes the wear sensor 128 and the first seal member 104. The wear sensor 128 has an encapsulation body 130 with a wear face 132, a sacrificial conductor 134 embedded within the encapsulation body 130 and spaced apart from the wear face 132, and a monitoring lead 136 extending into the encapsulation body 130 28 and connected to the sacrificial conductor 134. The wear sensor 128 is fixed relative to the first seal member 104 and the encapsulation body 130 has a wear coefficient 138 that is greater than a wear coefficient 140 of the first seal member 104.

The wear sensor 128 is fixed relative to the first seal member 104 such that the wear face 132 of the encapsulation body 130 opposes the second seal member 106. More particularly, the wear sensor 128 is fixed relative to the first seal member 104 such that wear face 132 of the encapsulation body 130 is in frictional engagement with the contact face 116 of the second seal member 106. Being in frictional engagement with the contact face 116 of the second seal member 106, relative movement between the wear face 132 and the contact face 116 of the second seal member 106 progressively reduces the spacing between sacrificial conductor 134 and the wear face 132. Further, being fixed relative to the first seal member 104 and having an encapsulation body wear coefficient 138 that is greater than the wear coefficient 140 of the first seal member 104, the rate at which the frictional engagement reduces the spacing between the sacrificial conductor 134 and the wear face 132 corresponds (i.e. is substantially equivalent) to the rate at which the first seal member 104 wears.

As shown in FIG. 3 the sensor assembly 102 is shown in a condition where the sacrificial conductor 134 is electrically continuous within the encapsulation body 130. It is contemplated that the sacrificial conductor 134 is electrically insulated by the encapsulation body 130. In certain embodiments the encapsulation body 130 is formed from a polymeric material 142. In accordance with certain embodiments the first seal member 104 is a carbon seal member, and includes a carbon material 144. It is also contemplated that the second seal member 106 be a steel seal member, and includes a steel material 146. The second seal member 106 can have a wear coefficient 138 that is lower than the wear coefficient 140 of the first seal member 104.

A resistance meter 148 is in electrical communication with the sacrificial conductor 134. More specifically, the resistance meter 148 is electrically connected to the sacrificial conductor 134 by the monitoring lead 136. The resistance meter 148 is configured to provide a worn seal indication 150 when an electrical parameter of the sacrificial conductor 134, e.g., resistance or current flow, exceeds (in the case or resistance) or falls below (in the case of current) a predetermined value.

Figure 4:
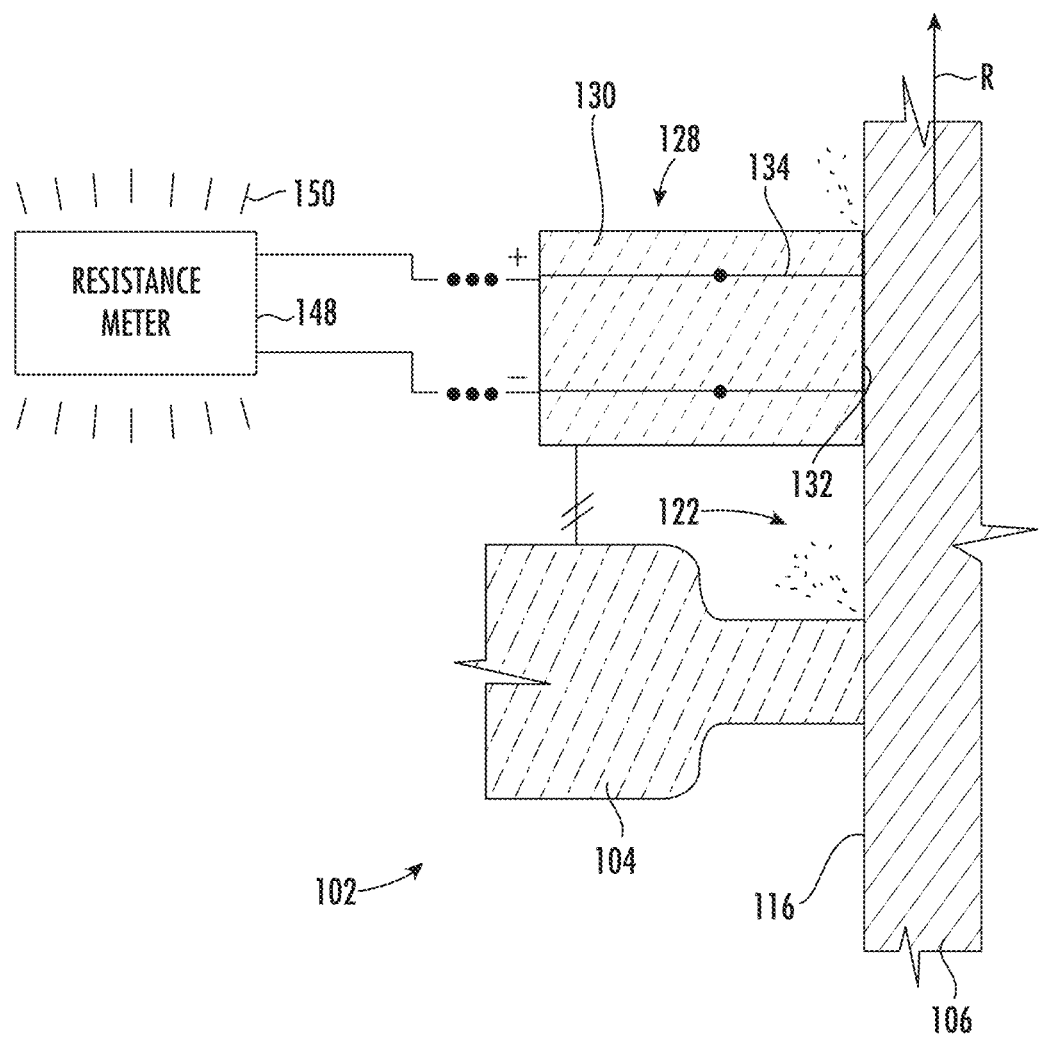
FIG. 4 is a schematic view of the sensor assembly of FIG. 1 according to the embodiment, showing the sacrificial conductor of the sensor assembly extending discontinuously within the encapsulation body subsequent to wear in the first seal member reaching the predetermined level.

In certain embodiments the resistance meter 148 includes a processor 158, a memory 160, a device interface 164, and a user interface 166. The processor 158 is operatively connected to the user interface 166, is operatively connected to the sensor 128 through the device interface 164, and is disposed in communication with the memory 160. The memory 160 a non-transitory machine readable medium and has a plurality of program modules 162 recorded on the memory 160 that, when read by the processor 158, cause the processor 158 to undertake certain operations. Among those operations are operations to apply a voltage to the sacrificial conductor 134 and acquire a measurement of an electrical parameter of the sacrificial conductor 134. When the electrical parameter indicates that the sacrificial conductor 134 is continuous, as shown in FIG. 3, the processor provides no indication of seal wear. When the electrical parameter indicates that the sacrificial conductor 134 is discontinuous, as shown in FIG. 4, the processor provides the indication of seal wear 150 (shown in FIG. 4). In a further respect instructions can cause the processor to execute the operations of a method 400 (shown in FIG. 7) of monitoring seal wear, as will be described.

As shown in FIG. 3 the sacrificial conductor 134 includes a wire loop 152. The wire loop 152 has a monitoring end 154 and a wear face end 156, the wear face end 156 of the wire loop 152 arranged between the wear face 132 of the encapsulation body 130 and the monitoring end 154 of the wire loop 152. Employment of the wire loop 152 allows for orientation of the sacrificial conductor 134 toward the contact face 116, e.g., a major dimension of the wire loop 152 is substantially parallel to the rotation axis 24, along the rotation axis 24. This causes the resistance change to be relatively pronounced with the second seal member 106 is electrically conductive.

With reference to FIG. 4, the sensor assembly 102 is shown in a condition where the sacrificial conductor 134 is electrically discontinuous within the encapsulation body 130. As the first seal member 104 wears against the encapsulation body 130 also wears. The wear progressive causes the sacrificial conductor 134 to advance toward the contact face 116 of the second seal member 106. When the advancement of the sacrificial conductor 134 is such that there is substantially no spacing between the sacrificial conductor 134 and wear face 132 the sacrificial conductor 134 comes into frictional engagement with the second seal member 106. Frictional engagement between the sacrificial conductor 134 and the second seal member 106 in turn wears the sacrificial conductor 134. When wear of the sacrificial conductor 134 is such that the sacrificial conductor 134 becomes discontinuous within the encapsulation body 130, electrical resistance of the sacrificial conductor 134 increases a value above a predetermined value, the resistance meter 148 provides the worn seal indication 150.

Figure 5:
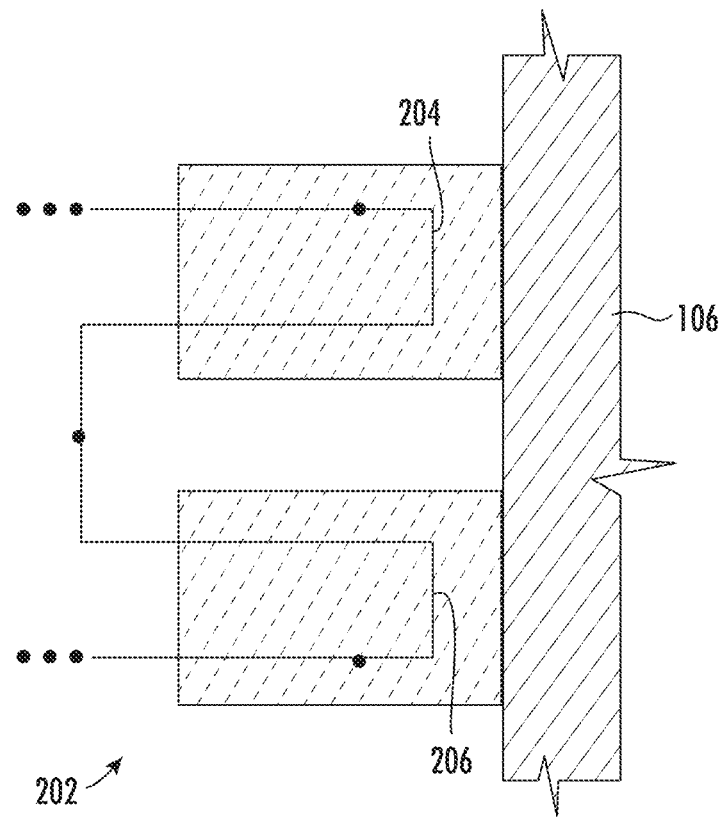
FIG. 5 is a schematic view of the sensor assembly FIG. 1 according to another embodiment, showing sacrificial conductors of the sensor assembly connected in series with one another.

With reference to FIG. 5, a sensor assembly 202 is shown. The sensor assembly 202 is similar to the sensor assembly 102 (shown in FIG. 2) and additionally includes a first sacrificial conductor 204 and a second sacrificial conductor 206. The second sacrificial conductor 206 is connected electrically with the first sacrificial conductor 204. More specifically, the second sacrificial conductor 206 is connected electrically in series with the first sacrificial conductor 204. Further, the second sacrificial conductor 206 is offset circumferentially about the rotation axis 24 (shown in FIG. 1) relative to the first sacrificial conductor 204. Being circumferentially offset from one another, the first sacrificial conductor 204 and the second sacrificial conductor 206 allow the sensor assembly 202 to provide the worn seal indication 150 (shown in FIG. 3) of seal wear when wear at the location either (or both) first sacrificial conductor 204 and the second sacrificial conductor 206 exceeds a predetermined amount.

As will be appreciated by those of skill in the art in view of the present disclosure, connecting the first sacrificial conductor 204 with the second sacrificial conductor 206 allows for monitoring for uneven seal wear because discontinuity in either the first sacrificial conductor 204 or the second sacrificial conductor 206 can increase resistance in the sensor assembly 202 sufficient for the resistance meter 148 (shown in FIG. 3) to indicate that seal wear has reached a predetermined level. Uneven seal wear can occur, for example, when the second seal member 106 (shown in FIG. 2) is fixed in rotation relative to the first seal member 104 (shown in FIG. 2) and one of the first seal member 104 and the second seal member 106 is radially misaligned relative to the other of the first seal member 104 and the second seal member 106. Although a sensor assembly 202 having a first sacrificial conductor 204 and a second sacrificial conductor 206 are shown in FIG. 5, it is to be understood and appreciated that certain embodiments of the sensor assembly 202 can have more than two sacrificial conductors, as suitable for an intended application.

Figure 6:
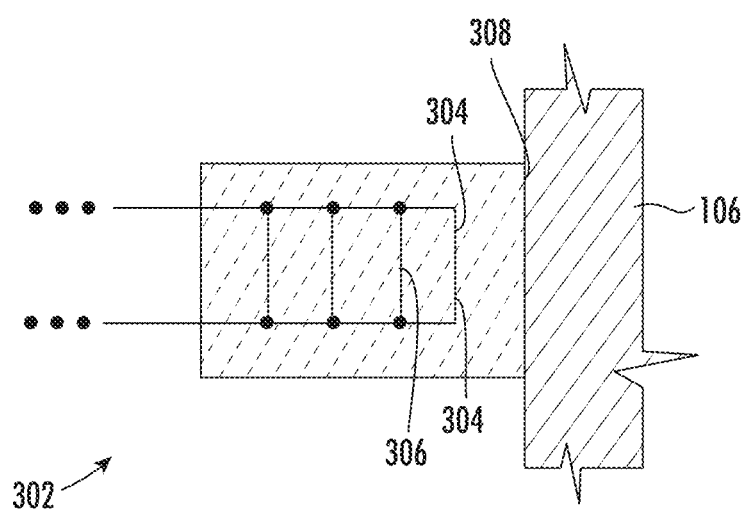
FIG. 6 is a schematic view of the sensor assembly of FIG. 1 according to a further embodiment, showing sacrificial conductors of the sensor assembly connected in parallel with one another.

With reference to FIG. 6, a sensor assembly 302 is shown. The sensor assembly 302 is similar to the sensor assembly 102 (shown in FIG. 2) and additionally includes a first sacrificial conductor 304 and a second sacrificial conductor 306. The second sacrificial conductor 306 is connected to the first sacrificial conductor 304 connected electrically to one another in parallel. More specifically, the first sacrificial conductor 304 and the second sacrificial conductor 306 are connected electrically with one another in parallel and are offset stepwise from a wear face 308 of an encapsulation body 130 containing the first sacrificial conductor 304 and the second sacrificial conductor 306 by different distances. Being offset from the wear face 308 stepwise by different distances, the sensor assembly 302 can provide graduated resistance change corresponding to accumulated seal wear. This allows the resistance meter 148 (shown in FIG. 3) to provide an indication of accumulated seal wear, for example, a prognostic indication of seal wear remaining prior to a the first seal member 104 requiring inspection and/or replacement using at least two stepwise changes in an electrical parameter. The electrical parameter can be one of electrical resistance and current flow. Although a sensor assembly 302 having a first sacrificial conductor 304 and a second sacrificial conductor 306 are shown in FIG. 6, it is to be understood and appreciated that certain embodiments of the sensor assembly 302 can have more than two sacrificial conductors, as suitable for an intended application.

Figure 7:
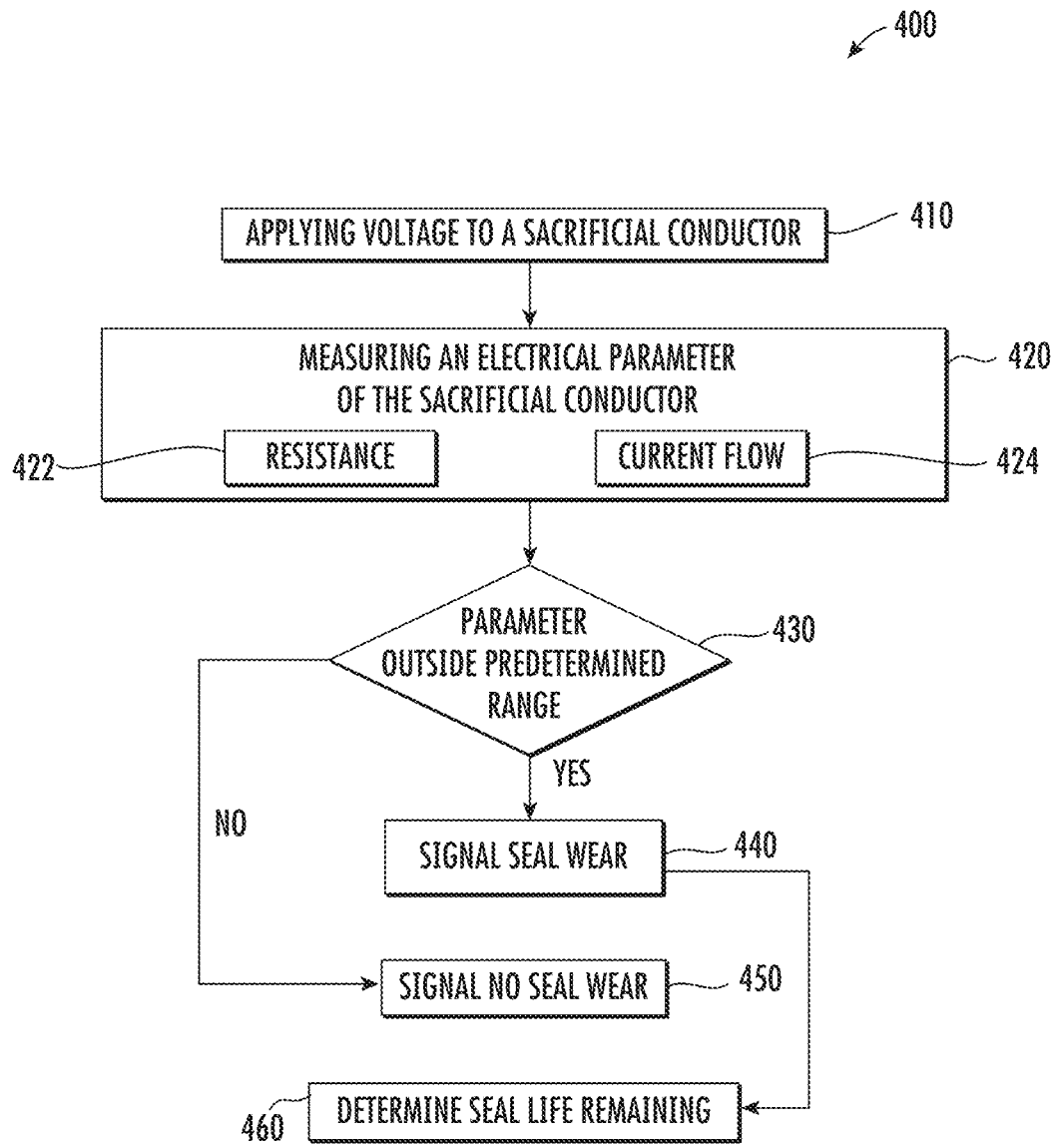
FIG. 7 is block diagram of a method of monitoring seal wear, showing operations of the method.

With reference to FIG. 7, the method 400 of monitoring seal wear is shown. The method 400 includes applying a voltage to a sacrificial conductor, e.g., the sacrificial conductor 134 (shown in FIG. 3), as shown with box 410. An electrical parameter of the sacrificial conductor is measured, as shown with box 420. The measurement is compared to a predetermined parameter range, as shown with box 430.

Seal wear is signalled when the measurement indicates that the sacrificial conductor is electrically discontinuous, as shown with box 440. No wear is signalled when the measurement indicates that the sacrificial conductor is electrically continuous, as shown with box 450. In certain embodiments determining remaining seal life based on the parameter measurement, as shown with box 460. It is contemplated that electrical parameter can include resistivity or current flow, as shown with boxes 422 and 424.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing arrangement, comprising:
 a bearing compartment housing a bearing assembly;
 a seal assembly configured to impound a lubricant within the bearing compartment, the seal assembly comprising:
  a first seal member having a first seal member contact face;
  a second seal member having a second seal member contact face, wherein, in operation, the second seal member contact face is fixed relative to an inner race of the bearing assembly;
 seal member biasing means that bias the first seal member contact face into frictional engagement with the second seal member contact face to impound the lubricant within the bearing compartment;
 a wear sensor fixed relative to the first seal member having:
  an encapsulation body with a wear face, wherein the encapsulation body has a wear coefficient greater than a wear coefficient of the first seal member;
  a sacrificial conductor embedded within the encapsulation body and spaced apart from the wear face; and
  a monitoring lead extending into the encapsulation body and connected to the sacrificial conductor; and
 a resistance meter in electrical communication with the sacrificial conductor, wherein the resistance meter comprises a processor in communication with a non-transitory machine readable medium with instructions recorded on it that, when read by the processor, cause the processor to:
  apply a voltage to the sacrificial conductor;
  measure an electrical parameter of the sacrificial conductor; and
  provide an indication of seal wear when the measurement of the electrical parameter indicates that the sacrificial conductor is electrically discontinuous.

2. The bearing arrangement of claim 1, wherein the encapsulation body is formed from a polymeric material.

3. The bearing arrangement of claim 1, wherein the sacrificial conductor is electrically insulated by the encapsulation body.

4. The bearing arrangement of claim 1, wherein the sacrificial conductor is electrically continuous within the encapsulation body.

5. The bearing arrangement of claim 1, wherein the sacrificial conductor is electrically discontinuous within the encapsulation body.

6. The bearing arrangement of claim 1, wherein the sacrificial conductor comprises a wire loop with a monitoring end and a wear face end, the wear face end of the wire loop arranged between the wear face of the encapsulation body and the monitoring end of wire loop.

7. The bearing arrangement of claim 1, wherein the sacrificial conductor is a first sacrificial conductor and further comprising a second sacrificial conductor, the second sacrificial conductor connected to the first sacrificial conductor.

8. The bearing arrangement of claim 7, wherein the second sacrificial conductor is connected electrically in series with the first sacrificial conductor.

9. The bearing arrangement of claim 7, wherein the second sacrificial conductor is connected electrically in parallel with the first sacrificial conductor.

10. The bearing arrangement of claim 1, wherein the instructions cause the resistance meter to measure seal wear based on at least two stepwise changes in the electrical parameter.

11. The bearing arrangement of claim 1, wherein the electrical parameter is one of electrical resistance and current flow.

12. The bearing arrangement as recited in claim 1, wherein the bearing assembly comprises:
 the inner race, wherein the inner race is arranged along a rotation axis;
 an outer race extending about the inner race; and
 a plurality of roller elements distributed about the rotation axis and between the inner race and the outer race, wherein the first seal member is fixed in rotation relative to the outer race.

13. The bearing arrangement as recited in claim 1, further comprising a shaft supported for rotation by the bearing assembly, wherein the first seal member comprises a carbon material, wherein the second seal member comprises a steel material, wherein the shaft is low pressure shaft or a high pressure shaft of a gas turbine engine.

* * * * *